United States Patent
Wei et al.

(10) Patent No.: US 9,813,277 B2
(45) Date of Patent: Nov. 7, 2017

(54) METHOD AND APPARATUS FOR PROCESSING A MULTIPLE-CARRIER SIGNAL PROVIDED WITH SUBCARRIERS DISTRIBUTED IN A BAND

(71) Applicant: MStar Semiconductor, Inc., Hsinchu Hsien (TW)

(72) Inventors: Fong-Shih Wei, New Taipei (TW); Ko-Yin Lai, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 430 days.

(21) Appl. No.: 14/595,483

(22) Filed: Jan. 13, 2015

(65) Prior Publication Data
US 2015/0200695 A1   Jul. 16, 2015

(30) Foreign Application Priority Data
Jan. 14, 2014   (TW) .............................. 103101315 A

(51) Int. Cl.
| | |
|---|---|
| *H04L 27/26* | (2006.01) |
| *H04L 25/03* | (2006.01) |
| *H04B 1/10* | (2006.01) |
| *H04W 24/08* | (2009.01) |
| *H04W 28/04* | (2009.01) |

(52) U.S. Cl.
CPC ....... *H04L 27/2649* (2013.01); *H04B 1/1027* (2013.01); *H04L 25/03821* (2013.01); *H04B 2001/1045* (2013.01); *H04L 27/2647* (2013.01); *H04W 24/08* (2013.01); *H04W 28/048* (2013.01)

(58) Field of Classification Search
CPC .......... H04B 1/1027; H04B 2001/1045; H04L 27/2649; H04W 24/02; H04W 24/08–24/10; H04W 28/0236; H04W 28/04–28/048
See application file for complete search history.

(56) References Cited

U.S. PATENT DOCUMENTS

| | | | | |
|---|---|---|---|---|
| 2013/0266093 | A1* | 10/2013 | Lindoff .................. | H04B 15/06 375/340 |
| 2013/0336274 | A1* | 12/2013 | Simonsson ........... | H04W 16/32 370/329 |
| 2015/0119062 | A1* | 4/2015 | Aoki .................... | H04W 72/082 455/452.1 |

FOREIGN PATENT DOCUMENTS

| | | |
|---|---|---|
| CN | 1114312 C | 7/2003 |
| CN | 102769861 A | 11/2012 |
| CN | 102857928 A | 1/2013 |

OTHER PUBLICATIONS

Taiwan Office Action, dated Oct. 8, 2015, 7 pages.

* cited by examiner

*Primary Examiner* — Eric Myers
(74) *Attorney, Agent, or Firm* — Edell, Shapiro & Finnan, LLC

(57) ABSTRACT

A method for processing a multiple carrier signal provided with subcarriers distributed in a band. The method includes calculating a subcarrier noise of an edge of the band, calculating a subcarrier noise of a center of the band, calculating a ratio of the subcarrier noise of the edge of the band to the subcarrier noise of the center of the band, determining whether the ratio is greater than a threshold, and acknowledging that the edge of the band suffers from interference when the ratio is greater than the threshold.

18 Claims, 5 Drawing Sheets

METHOD AND APPARATUS FOR PROCESSING A MULTIPLE-CARRIER SIGNAL PROVIDED WITH SUBCARRIERS DISTRIBUTED IN A BAND

This application claims the benefit of Taiwan application Serial No. 103101315, filed Jan. 14, 2014, the subject matter of which is incorporated herein by reference.

BACKGROUND OF THE INVENTION

Field of the Invention

The invention relates in general to receiving signals, and more particularly, to receiving multiple carrier signals.

Description of the Related Art

The finiteness of radio spectrum is an inevitable issue in the modern life. Transmission via multiple carrier signals yields a better spectrum utilization rate. For example, in an orthogonal frequency division multiple access (OFDMA) signal, one band may include multiple subcarriers. There are more and more standards based on OFDMA, including Digital Video Broadcasting-Terrestrial (DVB), Digital Video Broadcasting-Second Generation Terrestrial (DVB-T2), and Integrated Services Digital Broadcasting (ISDB).

Moreover, as diversified radio waves are cramped in a narrow spectrum, radio waves having similar frequencies inevitably interfere nearby frequencies. Such occurrence is referred to as an adjacent channel interference (ACI). From a timeline aspect, some adjacent channel interferences are instantaneous, while others may last for a quite long period. At least for OFDMA signals, these adjacent channel interferences last for a period of at least one symbol. From a frequency aspect, some adjacent channel interferences cover an entire band, while others may cover only a part of subcarriers of the band. In other words, by segmenting a band at a center frequency of the band, adjacent channel interferences may affect the high-frequency part or the low-frequency part.

For instantaneous adjacent channel interferences that cover an entire band, a receiver may perform a special process on the interfered symbols. However, for adjacent channel interferences that continuously cover a part of a band, a receiver needs to first know which subcarriers are interfered before being able to perform a special process on that part suffering from the adjacent channel interferences.

FIG. 1A shows a schematic diagram of a typical adjacent channel interference, where the horizontal axis represents the frequency. A band 100 is a frequency band occupied by a signal based on multiple carriers. The signal includes multiple subcarriers, denoted from 110A to 110I. In FIG. 1A, nine arrows pointing upwards indicate center frequencies of these subcarriers, with the center frequency of the subcarrier 110E also being a center frequency of the band 100.

In FIG. 1A, the vertical axis represents the signal strength. A surge of the signal strength resulted by an adjacent channel interference 120 is present near the center frequencies of the subcarriers 110H and 110I. The adjacent channel interference 120 at least affects the subcarriers 110H and 110I. Therefore, there is a need for a receiver capable of determining which subcarriers suffer from adjacent channel interferences in order to perform a special process on the interfered subcarriers.

SUMMARY OF THE INVENTION

According to an embodiment of the present invention, A method for processing a multiple carrier signal provided with subcarriers distributed in a band is provided. The method includes calculating subcarrier noise of an edge of the band, calculating a subcarrier noise of a center of the band, calculating a first ratio of the subcarrier noise of the edge of the band to the subcarrier noise of the center of the band, determining whether the first ratio is greater than a threshold, and acknowledging that the band suffers from interference when the first ratio is greater than the threshold.

According to an embodiment of the present invention, multiple carrier signal receiver processing a multiple carrier signal provided with subcarriers distributed in a band is provided. The receiver includes: a noise calculation module, configured to calculate a subcarrier noise of an edge of the band and a subcarrier noise of a center of the band; a ratio calculation module, configured to calculate a first ratio of the subcarrier noise of the edge of the band to the subcarrier noise of the center of the band; and a determination module, configured to determine whether the first ratio is greater than a threshold, and to acknowledge that the band suffers from interference when the first ratio is greater than the threshold.

In conclusion, one main spirit of the present invention is determining whether an edge of the band suffers from adjacent channel interferences through a ratio of subcarrier noises of the edge of the band and a center of the band, so as to further perform a special process on the subcarriers of the edge of the band that suffers from adjacent channel interferences.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of the present invention are described in detail below. Apart from the disclosed embodiments, the present invention is also applicable to other embodiments. The scope of the present invention is not limited by these non-limiting embodiments, and is defined in accordance with the appended claims. To better describe the contents of the present invention to one person skilled in the art and to keep the drawings clear, parts of the drawings are not drawn to actual sizes and ratios, and certain sizes and other associated scales may be emphasized to appear exaggerated, with unrelated details not entirely depicted.

Figure 2:
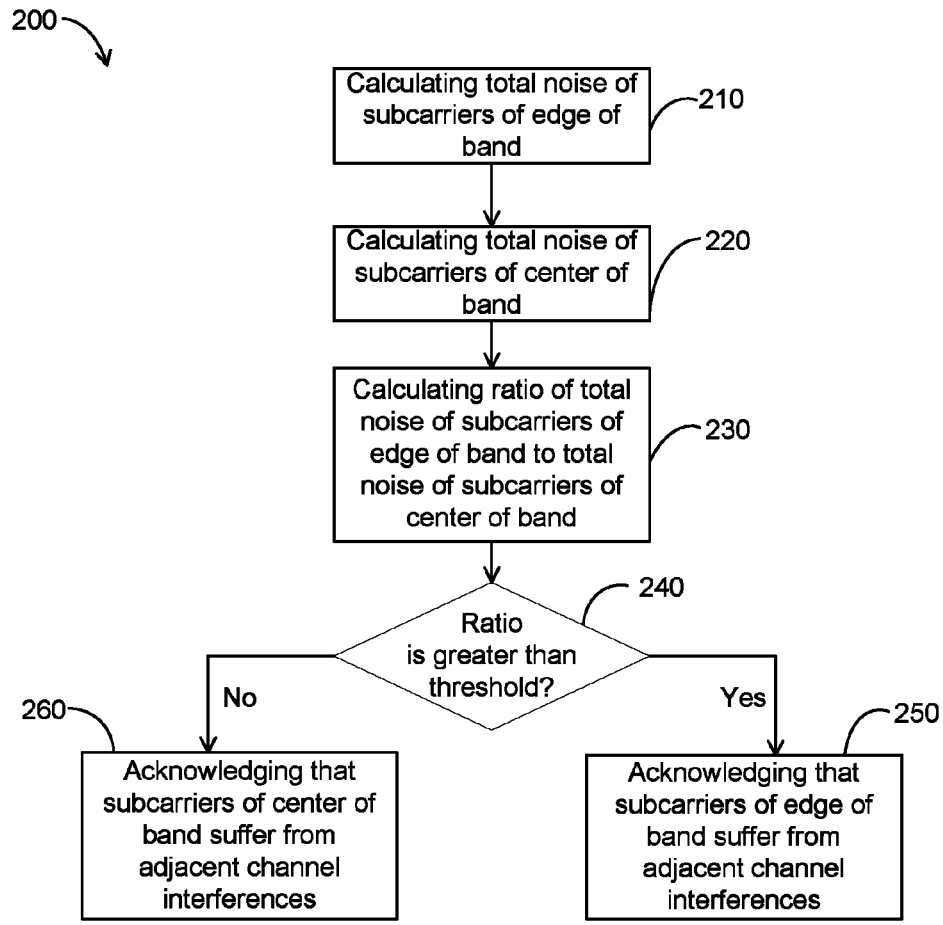
FIG. 2 is a flowchart of a process for determining whether an edge of the band suffers from adjacent channel interferences according to an embodiment of the present invention.

FIG. 2 shows a flowchart of a process 200 for determining whether an edge of the band suffers from adjacent channel interferences according to an embodiment of the present invention. The process 200 is adapted for a receiving method for multiple carrier signals. In the present invention, a multiple carrier signal covers one band, which includes at least three subcarriers. According to center frequencies of the subcarriers, the subcarriers may be categorized into subcarriers of an edge of the band and subcarriers of a center of the band. The edge of the band is divided into a high-frequency edge located to the right of the center frequency and having a higher frequency, and a low-frequency edge located to the left of the center frequency and having a lower frequency.

Figure 1A:
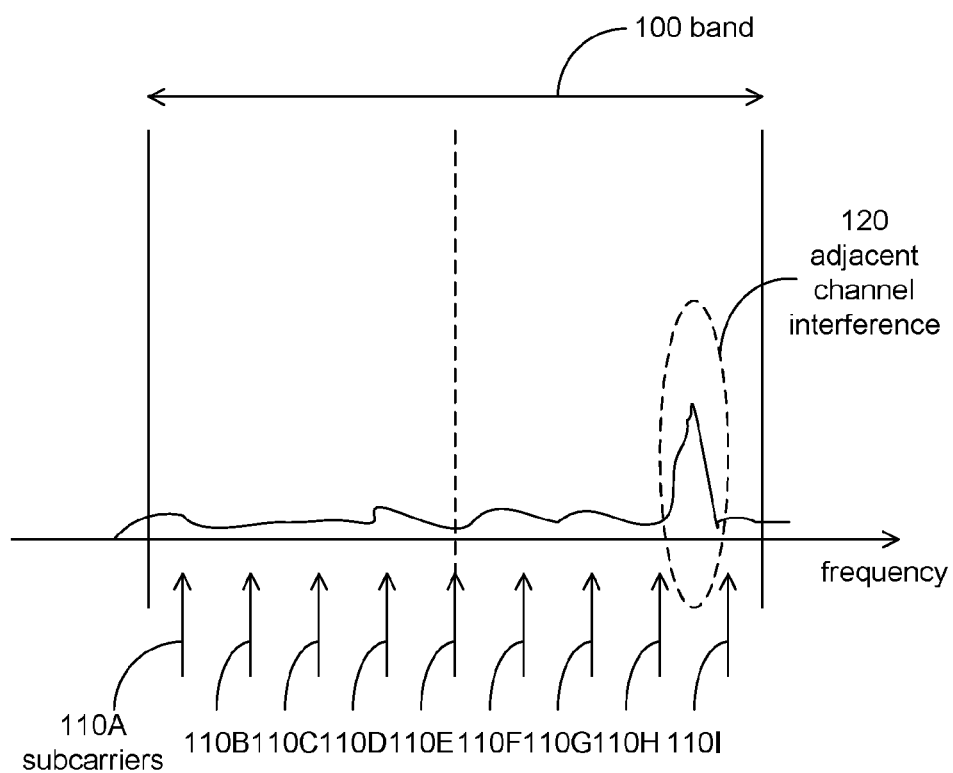
FIG. 1A is a schematic diagram of a spectrum of a typical adjacent channel interference.
Figure 1B:
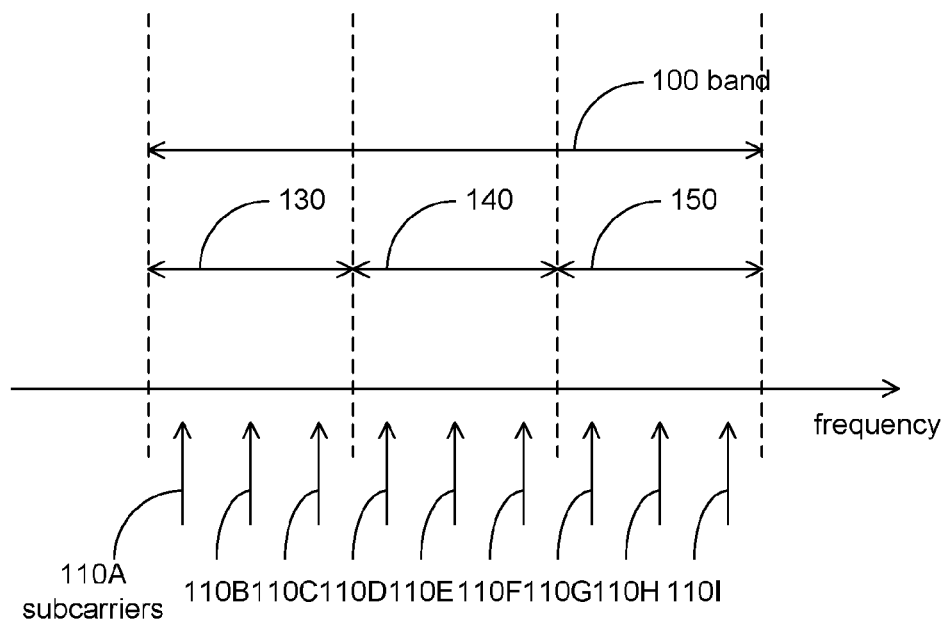
FIG. 1B is a schematic diagram of band segmentation applicable to a process shown in FIG. 2 according to an embodiment of the present invention.

FIG. 1B shows a schematic diagram of band segmentation suitable for the process 200 in FIG. 2 according to an embodiment of the present invention. Center frequencies of subcarriers in FIG. 1B are the same as those in FIG. 1A. The subcarriers 110A, 110B and 110C are subcarriers of a low-frequency edge of the band 130. The subcarriers 110E, 110E and 110F are subcarriers of a center of the band 140. The subcarriers 110G, 110H and 110I are subcarriers of a high-frequency edge of the band 150. These subcarriers may include pilot signals and data signals.

The process 200 includes following steps.

In step S210, a total noise of subcarriers of an edge of the band is calculated. In the embodiment, the edge of the band may be the low-frequency edge of the band 130 or the high-frequency edge of the band 150. When the low-frequency edge of the band 130 is selected, the subcarriers are the subcarriers 110A, 110B and 110C. When the high-frequency edge of the band 150 is selected, the subcarriers are the subcarriers 110G, 110H and 110I. In one embodiment, one may choose to calculate the total noise of subcarriers carrying pilot signals in an edge of the band. In another embodiment, one may choose to calculate the total noise of subcarriers carrying data signals in an edge of the band. In yet another embodiment, one may choose to calculate the total noise of subcarriers carrying pilot signals and data signals in an edge of the band. For example, when received signals are in a unit of symbols, e.g., OFDMA signals, step 210 utilizes the period of a particular symbol as the calculation unit. It should be noted that, the present invention does not limit the unit time to symbols.

In step 220, a total noise of subcarriers of a center of the band is calculated. In the embodiment, the center of the band 140 includes the subcarriers 110D, 110E and 110F. To correspond to step 210, when the subcarriers carrying pilot signals are selected in step 210, subcarriers carrying pilot signals are also selected in step 220. When the subcarriers carrying data signals are selected in step 210, subcarriers carrying data signals are also selected in step 220. When the subcarriers carrying pilot signals and data signals are selected in step 210, subcarriers carrying pilot signals and data signals are also selected in step 220. In addition, when step 210 utilizes a particular symbol as the calculation unit, step 220 also utilizes the same symbol as the calculation unit. In the present invention, the sequence of step 210 and 220 is not limited, and variations of performing either of the steps at a time or simultaneously performing both steps are within the scope of the present invention. Further, the present invention does not limit the calculation unit to symbols given that the two steps adopt the same time unit.

It should be noted that, when the receiver end adopts a design based on zero intermediate frequency, the center of the band 140 may include interferences of direct current electric signals. In other words, in a design of the receiver, instead of converting radio frequency (RF) signals to intermediate signals and then to baseband frequency signals, the RF signals are directly converted to baseband frequency signals. Thus, step 220 may include filtering out direct current electric signals.

In step 230, a ratio of the subcarrier noise of the edge of the band to the subcarrier noise of the center of the band is calculated. That is, the calculation result obtained in step 210 is divided by the calculation result obtained in step 220.

In step 240, when the ratio obtained in step 230 is greater than a threshold, the process 200 proceeds to step 250, or else the process 200 proceeds to step 260.

In step 250, it is acknowledged that the subcarriers of the edge of the band suffer from adjacent channel interferences.

In step 260, it is acknowledged that the subcarriers of the edge of the band are free from adjacent channel interferences. It should be noted that, the subcarriers of the edge of the band involved in step 250 and step 260 refer to the subcarriers of the edge of the band selected in step 210.

Figure 3:
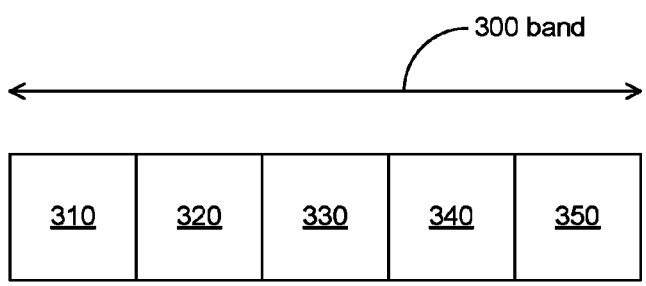
FIG. 3 is a schematic diagram of band segmentation according to an embodiment of the present invention.

FIG. 3 shows a schematic diagram of band segmentation according to an embodiment of the present invention. A band 300 in FIG. 3 includes five sub-bands 310 to 350. The process 200 in FIG. 2 is applicable to the band segmentation in FIG. 3. The edge of the band in step 210 may refer to the sub-bands 310, 320, 340 and 350. The center of the band in step 210 may refer to the sub-band 330. Given that a frequency width of an edge of the band is equal to a frequency width of a center of the band, the number of segments in a band is not limited. For example, the frequency widths of the sub-bands 310, 320, 340 and 350 are equal to the frequency width of the center sub-band 330.

Figure 4:
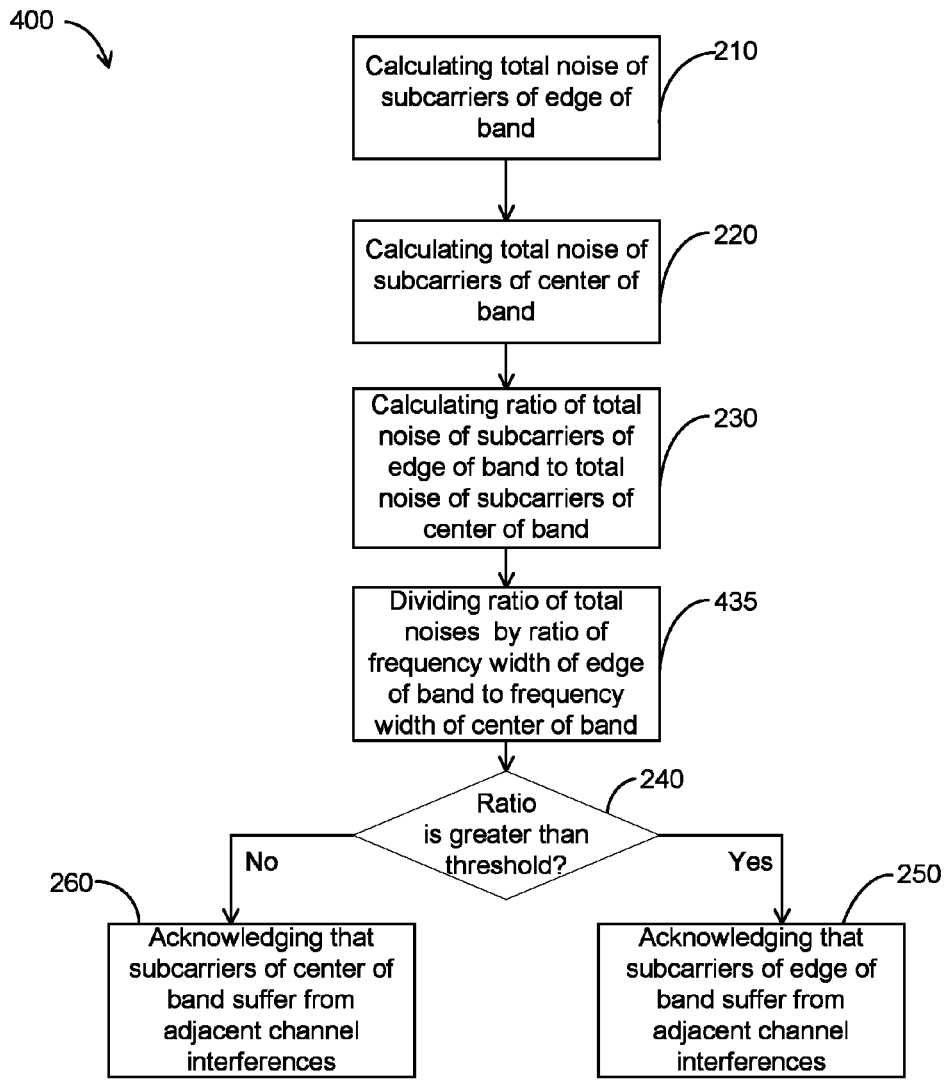
FIG. 4 is a schematic diagram of a variation process derived from the process in FIG. 2.

FIG. 4 shows a variation process 400 derived from the process 200 in FIG. 2. A difference of the process 400 in FIG. 4 from the process 200 in FIG. 2 is that, the process 400 in FIG. 4 is for processing embodiments where the frequency width of an edge of a band is different from the frequency width of a center of the band. Compared to the process 200 in FIG. 2, the process 400 in FIG. 4 includes an additional step 435. In step 435, the ratio of the total noises is divided by a ratio of the frequency widths of the edge of the band and the center of the band to eliminate the effect of the unequal frequency widths of the edge of the band and the center of the band. Details of the steps with the same denotations as those in FIG. 2 can be referred from the description associated with FIG. 2, and shall be omitted herein.

Figure 5:
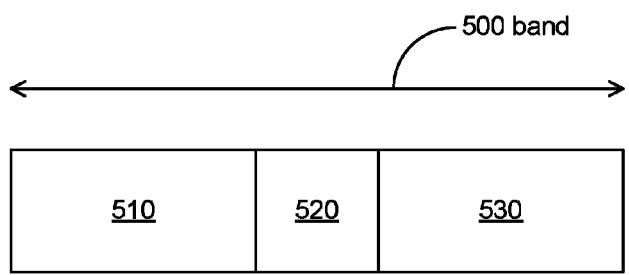
FIG. 5 is a schematic diagram of band segmentation according to another embodiment of the present invention.

FIG. 5 shows a schematic diagram of band segmentation according to another embodiment of the present invention. A band 500 in FIG. 5 includes three sub-bands—a low-frequency edge of the band 510, a center of the band 520, and a high-frequency edge of the band 530. It is observed from the drawing that the frequency width of the low-frequency edge of the band 510 is twice of that of the center of the band 520, and the frequency width of the high-frequency edge of the band 530 is also twice of that of the center of the band 520.

Assuming that the entire band 500 in average receives additive white Gaussian noise (AWGN), the noise of the low-frequency edge of the band 510 and the high-frequency edge of the band 530 are expectedly twice of those of the center of the band 520. Thus, in the process 400, after step 230 calculates the ratio of the subcarrier noise of the edge of the band to that of the center of the band, step 435 needs to be repeated. That is, the ratio of the total noises calculated in step 230 is divided by the ratio of the frequency width of the edge of the band to that of the center of the band to eliminate the effect of unequal frequency widths. Step 240 is then performed according to the new ratio calculated in step 435.

One person skilled in the art can easily understand that, although the ratio of the frequency width of the edge of the band to that of the center of the band is twofold, the present invention is applicable to frequency width ratios of other multiples. Further, the multiple need not be an integral multiple. For example, the frequency width of the edge of the band may be 1.5 of that of the center of the band.

Figure 6:
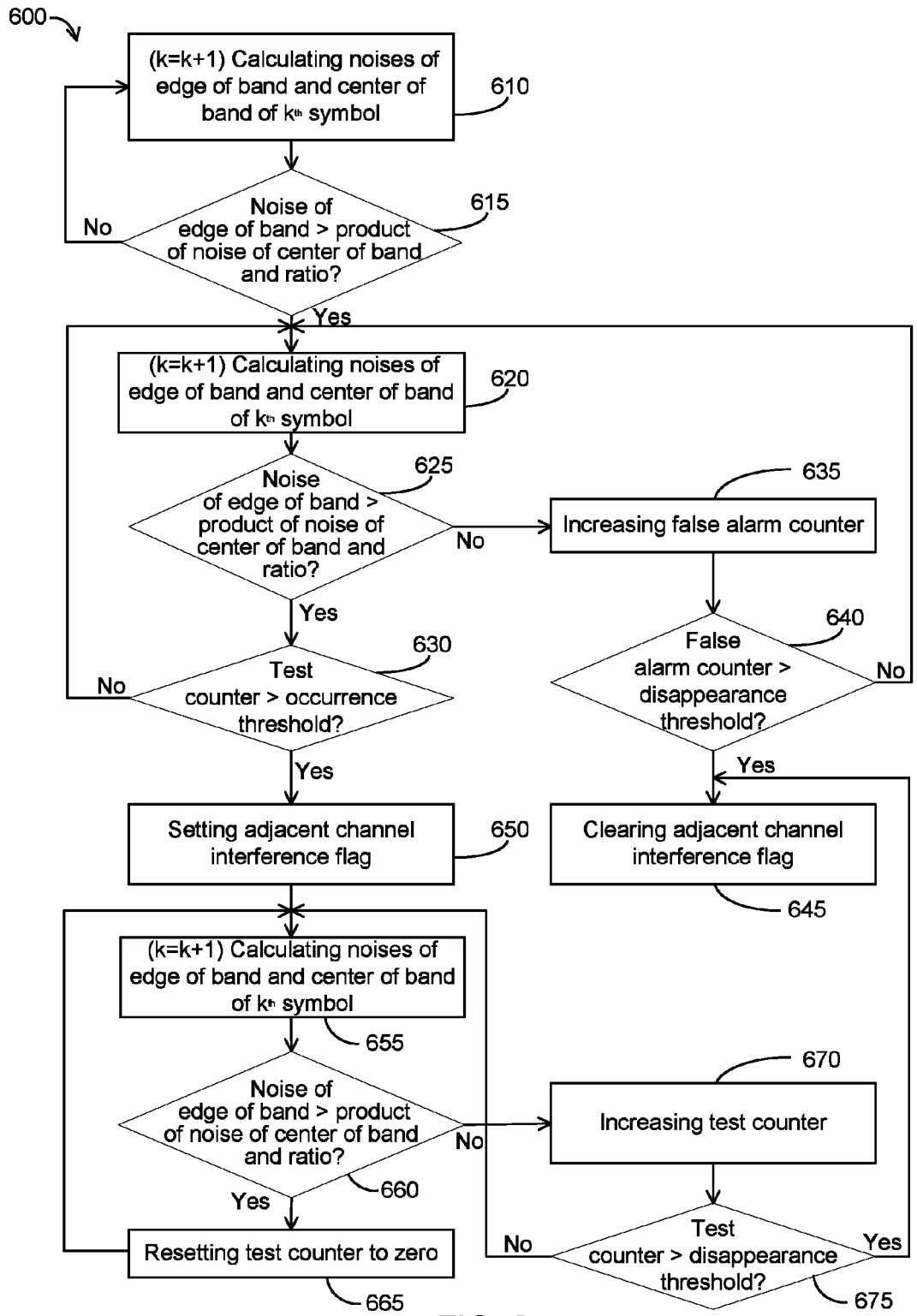
FIG. 6 is a schematic diagram of a process according to another embodiment of the present invention.

FIG. 6 shows a flowchart of a process 600 according to another embodiment of the present invention. One main object of the process 600 is to continuously inspect a ratio relationship between an edge of a band and a center of the band to mitigate the probability of misjudgment. The process 600 includes following steps.

In step 610, for a $k^{th}$ symbol, noises of an edge of the band and a center of the band are calculated. Details of this step may be referred from the description of steps 210 and 220 in FIG. 2 as well as steps 210 and 220 in FIG. 4. When step 610 is performed for the first time, k=k+1 is not necessary. In a preferred embodiment of the present invention, k may be increased by 1 each time, or k may be increased by n each time, where n is a positive integer greater than or equal to 1. The value of n is not limited by the present invention.

In step 615, it is compared whether the noise of the edge of the band is greater than a product of the noise of the center of the band and a ratio. In one embodiment, when the frequency width of the edge of the band is substantially equal to that of the center of the band, the above ratio may be purely a ratio value, e.g., 1.5. In another embodiment, when the frequency width of the edge of the band is different from that of the center of the band, the above ratio may be a product of a ratio value and a ratio of the frequency widths of the two bands. For example, when the ratio of the frequency width of the edge of the band to that of the center of the band is 2:1, the above ratio value may be 1.5*2, i.e., 3. When the noise of the edge of the band is greater than the product, the process 600 proceeds to step 620, or else returns to step 610. One person skilled in the art can understand that, step 615 is substantially equivalent to step 240 in FIG. 2 and FIG. 4. There are various modifications and parameters for the comparison, and the form of comparison is not limited by the present invention.

In step 620, similar to step 610, the noises for one entire symbol are again calculated, followed by performing step 625.

In step 625, similar to step 615, when the result is true, the process 600 proceeds to step 630 or else proceeds to step 635.

In step 630, it is determined whether a test counter is greater than an occurrence threshold. The process 600 proceeds to step 650 when the test counter is greater than the occurrence threshold, or else returns to step 620.

In step 635, a false alarm counter is increased.

In step 640, it is determined whether the false alarm counter is greater than a disappearance threshold. The process 600 proceeds to step 645 when the false alarm counter is greater than the disappearance threshold, or else returns to step 620.

In step 645, an adjacent channel interference flag is cleared. In other words, process 600 determines that adjacent channel interferences are absent, and so no special process needs to be performed on the edge of the band.

In step 650, the adjacent channel interference flag is set. The process 600 determines that the edge of the band suffers from adjacent channel interferences, and a special process needs to be performed on the interfered edge of the band. The process 600 then proceeds to step 655.

Step 655 is similar to step 610 or 620. The process 600 then proceeds to step 660.

The determination step 660 is similar to step 615 or 625. When the determination result is true, the process 600 proceeds to step 665, or else proceeds to step 670.

In step 665, the above test counter is reset to zero, and the process 600 returns to step 655.

In step 670, the above test counter is increased, followed by performing step 675.

In step 675, it is determined whether the test counter is greater than the disappearance counter. The process 600 returns to step 645 if so, or else returns to step 655. In one embodiment, the disappearance thresholds in steps 640 and 675 may be the same. In another embodiment, the disappearance thresholds in steps 640 and 675 may be different.

Figure 7:
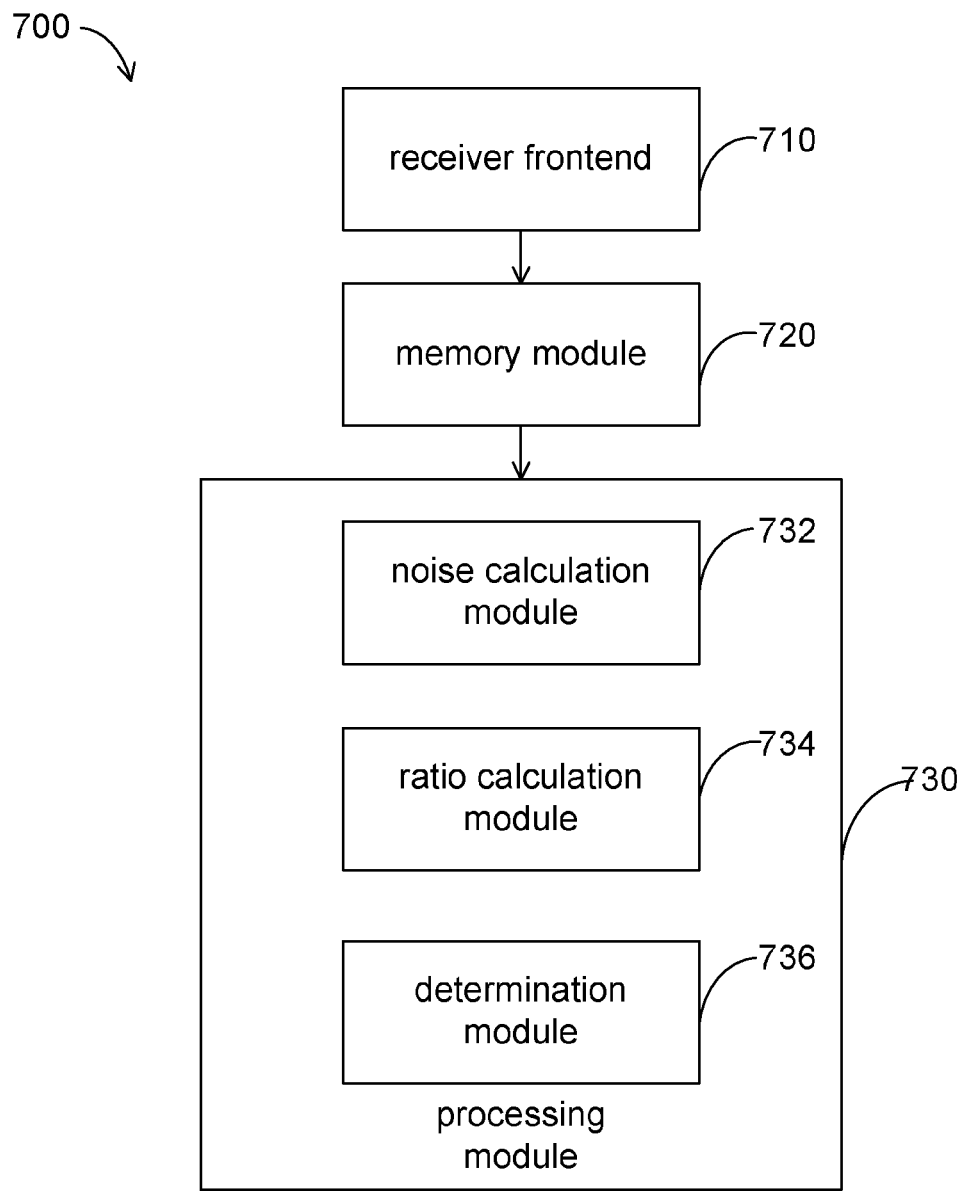
FIG. 7 is a block diagram of a signal receiver according to an embodiment of the present invention.

FIG. 7 shows a block diagram of a signal receiver 700 according to an embodiment of the present invention. The receiver 700 is adapted to receive multiple carrier signals. In some embodiments, the receiver 700 may receive signals transmitted in form of OFDMA. The receiver 700 includes a receiver frontend 710, a memory module 720 and a processing module 730. The receiver frontend 710 may include circuits such as an antenna, an analog-to-digital converter (ADC), a sampler, and a fast Fourier converter, and is configured to parse digital signals that are further stored in the memory module 720.

The processing module 730 includes a noise calculation module 732, a ratio calculation module 734, and a determination module 736. The processing module 730 may perform the processes 200, 400 and 600 in FIG. 2, FIG. 4 and FIG. 6. In one embodiment, the noise calculation module 732 performs steps 210 and 220 of the process 200, the calculation module 734 performs step 230 of the process 200, and the determination module 736 performs steps 240 to 260 of the process 200.

In one embodiment, the noise calculation module 732 performs steps 210 and 220 of the process 400, the ratio calculation module 734 performs steps 230 and step 435 of the process 400, and the determination module 736 performs steps 240 to 260 of the process 400.

In another embodiment, the noise calculation module 732 performs steps 610, 620 and 655 of the process 600, the ratio calculation module 734 performs steps 615, 625 and step 660 of the process 600, and the determination module 736 performs the remaining steps of the process 600.

One person skilled in the art can understand that, the processing module 730 may be implemented by software, hardware, or a combination of software and hardware. The implementation form of the processing module 730 is not limited by the present invention.

In conclusion, one main spirit of the present invention is determining whether an edge of a band suffers from adjacent channel interferences through a ratio of subcarrier noises of the edge of the band and a center of the band, so as to further perform a special process on the subcarriers of the edge of the band that suffers from adjacent channel interferences.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for processing a multiple carrier signal provided with subcarriers distributed in a band, comprising:
   calculating a subcarrier noise of an edge of the band;
   calculating a subcarrier noise of a center of the band;
   calculating a first ratio of the subcarrier noise of the edge of the band to the subcarrier noise of the center of the band;
   determining whether the first ratio is greater than a threshold;
   acknowledging that the edge of the band suffers from interference when the first ratio is greater than the threshold; and
   dividing the first ratio by a ratio of a frequency width of the edge of the band to a frequency width of the center of the band.

2. The receiving method according to claim 1, wherein contents carried by the subcarriers comprises at least one of a pilot signal and a data signal.

3. The receiving method according to claim 1, wherein the subcarrier noise of the edge of the band and the center of the band is a total noise of one of:
   all of the subcarriers;
   one of the subcarriers; and
   a part of all of the subcarriers.

4. The receiving method according to claim 1, when the first ratio corresponding to a first symbol is greater than the threshold, the receiving method further comprising:
   calculating the subcarrier noise of the edge of the band of a second symbol, the second symbol being a symbol subsequent to the first symbol;
   calculating the subcarrier noise of the center of the band of the second symbol;
   calculating a second ratio of the subcarrier noise of the edge of the band to the subcarrier noise of the center of the band of the second symbol;
   determining whether the second ratio is greater than the threshold; and
   acknowledging that the edge of the band suffers from interference when the second ratio is greater than the threshold, and setting an adjacent channel interference flag.

5. The receiving method according to claim 4, when the second ratio is not greater than the threshold, the receiving method further comprising:
   increasing a value of a false alarm counter;
   determining whether the value of the false alarm counter is greater than a disappearance threshold; and
   acknowledging that the edge of the band is free from channel interference when the value of the false alarm is greater than the disappearance threshold.

6. The receiving method according to claim 4, when the second ratio is greater than the threshold, the receiving method further comprising:
   determining whether a test counter is greater than an occurrence threshold; and
   acknowledging that the edge of the band suffers from interference when the test counter is greater than the occurrence threshold.

7. The receiving method according to claim 6, after the step of setting the adjacent channel interference flag, further comprising:
   calculating the subcarrier noise of the edge of the band of a third symbol, the third symbol being a symbol subsequent to the second symbol;
   calculating the subcarrier noise of the edge of the band of the third symbol;
   calculating a third ratio of the subcarrier noise of the edge of the band to the subcarrier noise of the center of the band of the third symbol;
   determining whether the third ratio is greater than the threshold;
   resetting the test counter to zero when the third ratio is greater than the threshold; and
   increasing the test counter when the third ratio is not greater than the threshold.

8. The receiving method according to claim 7, after the step of increasing the test counter, further comprising:
   determining whether the test counter is greater than a disappearance threshold; and
   acknowledging that the edge of the band is free from interference when the test counter is greater than the disappearance threshold, and clearing the adjacent channel interference flag.

9. The receiving method according to claim 1, wherein the step of calculating the subcarrier noise of the center of the band further comprises filtering out direct current electric signals.

10. The receiving method according to claim 1, wherein the multiple carrier signals are orthogonal frequency division multiple access (OFDMA) signals.

11. A multiple carrier signal receiver processing a multiple carrier signal provided with subcarriers distributed in a band, comprising:
    a receiver front end;
    a memory in communication with the receiver front end; and
    a processor in communication with the memory, the processor configured to:
    calculate a subcarrier noise of an edge of the band and a subcarrier noise of a center of the band;
    calculate a first ratio of the subcarrier noise of the edge of the band to the subcarrier noise of the center of the band; and
    determine whether the first ratio is greater than a threshold, and to acknowledge that the edge of the band suffers from interference when the first ratio is greater than the threshold,
    the processor further configured to divide the first ratio by a ratio of a frequency width of the edge of the band to a frequency width of the center of the band.

12. The receiver according to claim 11, wherein contents carried by the subcarriers comprises at least one of a pilot signal and a data signal.

13. The receiver according to claim 11, wherein the subcarrier noise of the edge of the band and the center of the band is a total noise of one of:
    all of the subcarriers;
    one of the subcarriers; and
    a part of all of the subcarriers.

14. The receiver according to claim 11, wherein when the first ratio corresponding to a first symbol is greater than the threshold,
    the processor further configured to:
    calculate the subcarrier noise of the edge of the band of a second symbol and the subcarrier noise of the center of the band of the second symbol, the second symbol being a symbol subsequent to the first symbol;
    calculate a second ratio of the subcarrier noise of the edge of the band to the subcarrier noise of the center of the band of the second symbol; and
    determine whether the second ratio is greater than the threshold, acknowledges that the edge of the band suffers from interference when the second ratio is greater than the threshold, and sets an adjacent channel interference flag.

15. The receiver according to claim 14, wherein when the second ratio is not greater than the threshold, the processor is further configured to:
   increase a value of a false alarm counter;
   decrease whether the value of the false alarm counter is greater than a disappearance threshold; and
   acknowledge that the edge of the band is free from interference when the value of the false alarm is greater than the disappearance threshold.

16. The receiver according to claim 14, wherein when the second ratio is greater than the threshold, the processor is further configured to:
   determine whether a test counter is greater than an occurrence threshold; and
   acknowledge that the edge of the band suffers from interference when the test counter is greater than the occurrence threshold.

17. The receiver according to claim 16, wherein after the adjacent channel interference flag is set:
   the processor is further configured to calculate the subcarrier noise of the edge of the band of a third symbol and the subcarrier noise of the edge of the band of the third symbol, the third symbol being a symbol subsequent to the second symbol;
   calculate a third ratio of the subcarrier noise of the edge of the band to the subcarrier noise of the center of the band of the third symbol; and
   determine whether the third ratio is greater than the threshold, resets the test counter to zero when the third ratio is greater than the threshold, and increases the test counter when the third ratio is not greater than the threshold.

18. The receiver according to claim 17, when after the test counter is increased, the processor is further configured to:
   determine whether the test counter is greater than a disappearance threshold; and
   acknowledge that the edge of the band is free from interference when the test counter is greater than the disappearance threshold, and clears the adjacent channel interference flag.

* * * * *